A. L. STEWART, E. W. BULLOCK AND S. H. EARL.
TOOL MECHANISM FOR GEAR CUTTING MACHINES.
APPLICATION FILED JUNE 1, 1920.
1,378,629. Patented May 17, 1921.
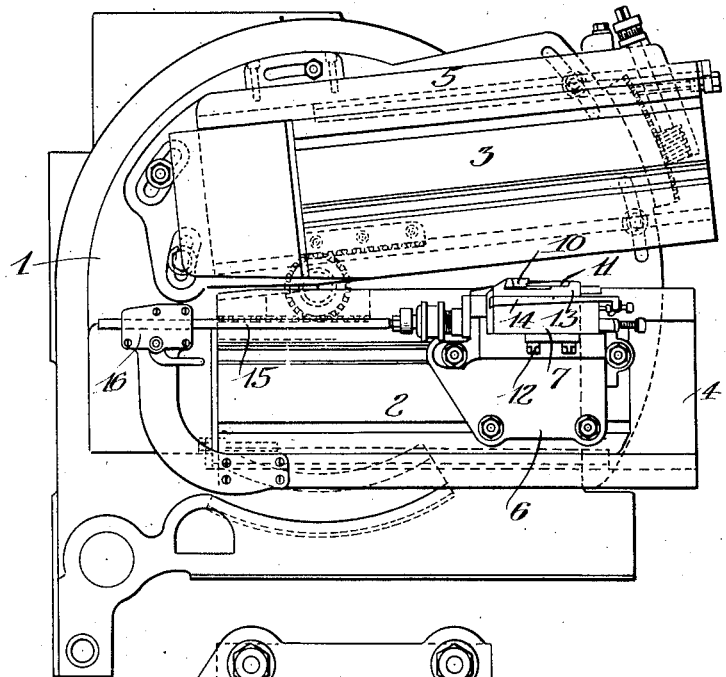
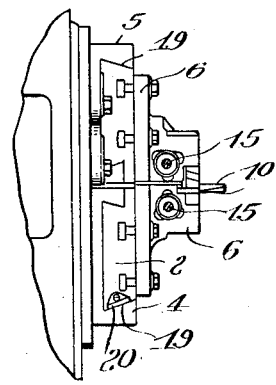
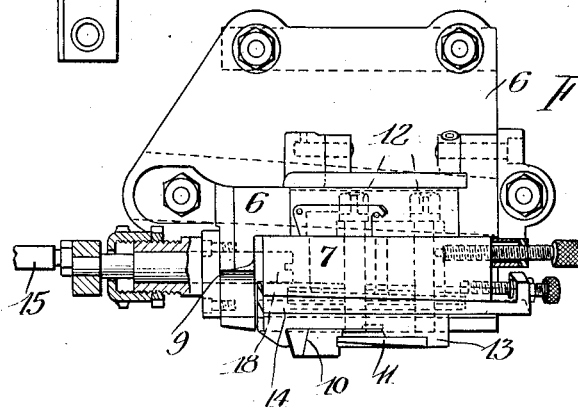
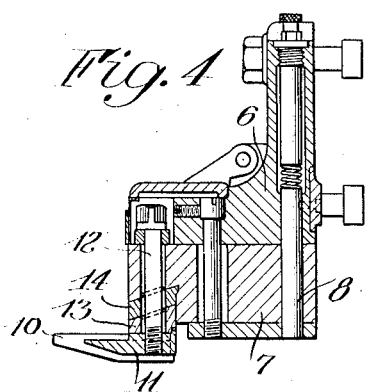
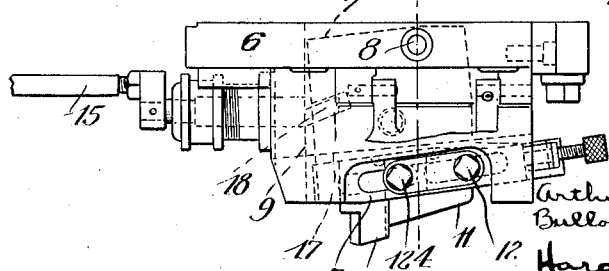
INVENTORS
Arthur L. Stewart, Edward W.
Bullock, Schuyler H. Earl
BY Harold E. Stonebraker
their ATTORNEY

UNITED STATES PATENT OFFICE.

ARTHUR L. STEWART, EDWARD W. BULLOCK, AND SCHUYLER H. EARL, OF ROCHESTER, NEW YORK, ASSIGNORS TO GLEASON WORKS, OF ROCHESTER, NEW YORK, A CORPORATION OF NEW YORK.

TOOL MECHANISM FOR GEAR-CUTTING MACHINES.

1,378,629.     Specification of Letters Patent.     Patented May 17, 1921.

Original application filed October 24, 1919, Serial No. 333,014. Divided and this application filed June 1, 1920. Serial No. 385,645.

*To all whom it may concern:*

Be it known that we, ARTHUR L. STEWART, EDWARD W. BULLOCK, and SCHUYLER H. EARL, citizens of the United States of America, residing at Rochester, in the county of Monroe and State of New York, have invented certain new and useful Improvements in Tool Mechanism for Gear-Cutting Machines, of which the following is a specification.

The invention relates to tool mechanism for gear cutting and other metal planing machines, and is a division of application Serial No. 333,014, filed October 24, 1919.

A principal purpose of the improvement is to afford an improved reciprocating tool mechanism, of such form as to effectually obviate any chatter during the cutting stroke.

A further purpose of the invention is to provide a simple and practical construction for rigidly maintaining the tools while cutting, and also readily permitting withdrawal of the tools from the blank during the return or non-cutting stroke.

Another object is to provide improved tool slide supporting means so as to give a firm, strong support for the tool slides.

With these and other ends in view, the invention consists in certain improvements and combinations of parts, as will appear clearly from the following description, the novel features being pointed out in the claims at the end of the specification.

In the drawings:

Figure 1 is a side elevation, showing the tool carriages of a bevel gear cutting apparatus with the tool mechanism of the present invention applied to one of the tool carriages;

Fig. 2 is an enlarged side view of the tool box;

Fig. 3 is an enlarged plan view of the parts shown in Fig. 2;

Fig. 4 is an enlarged sectional view on line 4—4 of Fig. 3, and

Fig. 5 is an end elevation of the tool supporting arms and slides.

It will be understood that the invention is applicable to various types of metal planing machinery, and for convenience of illustration, it is here shown in connection with the usual type of bevel gear machine, in which 1 designates an oscillatory carriage upon which are mounted a pair of tool slides 2 and 3, which are reciprocated within the arms 4 and 5, the latter being suitably supported on the carriage 1, and for the purposes of the present disclosure it is unnecessary to set forth the particular mechanism by which the slides 2 and 3 are reciprocated. It is sufficient, for an understanding of this invention, to know that the slides 2 and 3 are alternately moved back and forth across the blank operated upon, and the invention of this application has to do with the tool mechanism upon the slides 2 and 3.

Bolted to each tool slide 2 and 3 is a tool box 6, and mounted within the latter is a pivoted clapper block 7 mounted to swing about the axis 8 and limited in its movement by engagement with the wall 9, as shown in Fig. 3. The tool 10 is held in place on the clapper block by a binder plate 11 and bolts 12, which retain the tool against the tool holder 13, the latter engaging a wedge 14. As the slide travels back and forth, the clapper block and tool are oscillated about the axis 8 in order to present the tool in cutting position to the blank during the cutting stroke, and to withdraw the tool from the blank during the return or non-cutting stroke, as common in this class of machinery.

One great difficulty has been to permit this pivotal motion of the clapper block and tool and yet maintain a sufficiently rigid relationship during cutting to prevent chatter of the tool or clapper block. This is accomplished in the present invention by a structure which takes up fully any lost motion, and holds the tool tightly during the cutting stroke by a wedge-like action.

The swinging movement of the clapper block is accomplished by a connecting device comprising a rod 15 which is slidable in a friction clamp 16, whereby when the tool slide travels on its return stroke, the tension exerted on the connecting rod 15 rocks the clapper block so as to withdraw the tool, and during the cutting stroke sufficient pressure is exerted on the connecting rod 15 to rock the clapper block in the opposite direction and move the tool into cutting position.

To bring about this wedge-like action which prevents chatter of the tool, the clapper block 7, referred to above, is provided with an opening or recess 17 (see Fig. 3), the opposite operating surfaces of which are inclined to the direction of travel of the tool slide. Coöperating with the recess 17 is an angular tongue or projecting portion 18 which is connected to or carried by the connecting rod 15. The tongue 18 loosely engages the recess 17 and is provided with opposite surfaces that are correspondingly inclined to the direction of travel of the tool slide. As the connecting rod 15 is forced toward the clapper block 7, the latter is held in its outermost position by means of the coöperating inclined surfaces, the tongue 18 acting as a wedge on the clapper block and serving to prevent the slightest chatter, any lost motion being taken up automatically by the necessary additional inward movement of the tongue 18. During the return stroke, the connecting rod 15 is withdrawn with relation to the clapper block, and the outward movement of the tongue 18 causes a corresponding inward movement of the clapper block, withdrawing the tool from the work, and holding the tool withdrawn during the return or non-cutting stroke of the tool.

The advantages of this feature of the invention are due largely to the manner of connecting the rod 15 and the clapper block, so that the cutting position of the tool and its retention against chatter is dependent upon two coöperative engaging surfaces, one wedging against the other. This insures an absolutely firm, rigid supporting connection for the tool, while also permitting the latter to be readily and quickly withdrawn from cutting position during the return stroke.

As an additional means for imparting rigidity to the tools, each tool supporting arm 4 and 5 is provided with undercut portions or dovetail guideways 19, and the tool slides are similarly formed to engage the ways 19. Each tool slide is supported on its under surface by the lowermost surface of the guideway in which it travels, and is also provided with an adjustable wedge member 20 for taking up any lost motion or wear between the slide and the arm. By arranging the tool slides so as to project within guideways of the tool arm, and to be supported upon the bottom surfaces of such guideways, a more stable and consequently more efficient construction is had.

The particular disclosure of this application may be modified in various ways, and the purpose is to cover any such changes or departures as may come within the underlying features of the improvements and the scope of the following claims.

We claim:

1. The combination with a reciprocating tool slide, of a pivoted clapper block, a tool secured to the clapper block, and means for tilting the clapper block on the return stroke of the tool comprising a friction clamp, a connecting rod slidable in the friction clamp, the clapper block having a recess therein, and a projecting portion carried by the connecting rod and engaging said recess.

2. The combination with a reciprocating tool slide, of a clapper block and tool mounted thereon, and means for tilting the clapper block on the return stroke of the tool to move the latter from cutting relation with a blank, said means comprising a friction clamp and a connecting rod movable in the friction clamp and connected to the clapper block so as to effect a wedging action thereon during the cutting stroke.

3. The combination with a reciprocating tool slide, of a clapper block mounted thereon, a tool secured to the clapper block, and means for tilting the clapper block on the return stroke of the tool to remove the latter from cutting relation with a blank, said means comprising a friction clamp, the clapper block having a recess therein disposed at an angle to its line of travel, and a connecting rod slidable in said clamp and provided with an angular projecting portion engaging said recess in the clapper block.

4. The combination with a reciprocating tool slide, of a clapper block mounted thereon, a tool secured to the clapper block, and means for tilting the clapper block on the return stroke of the tool to remove the latter from cutting relation with a blank, said means comprising a friction clamp, and a connecting device movable in the friction clamp and loosely engaging the clapper block and effecting a wedging action thereon during the cutting operation.

5. The combination with a reciprocating tool slide, of a clapper block movable thereon, a tool secured to the clapper block, and means for tilting the clapper block during the return stroke of the tool to remove the latter from cutting relation with a blank, said means comprising a friction clamp, and a connecting device movable in the friction clamp and operatively associated with the clapper block so as to hold the latter rigidly and prevent any lost motion thereof during the return stroke of the tool.

6. The combination with a reciprocating tool slide, of a clapper block mounted thereon for holding a tool, and means for tilting the clapper block during the return stroke of the tool to remove the latter from cutting relation with a blank, said means comprising a friction clamp and a connecting device movable in the friction clamp and loosely associated with the clapper block whereby to tilt the latter in opposite directions during the cutting and return strokes of the tool and to hold the clapper block rigidly during the cutting stroke.

7. The combination with a reciprocating tool slide, of a clapper block mounted thereon and holding a tool, and means for tilting the clapper block during the return stroke of the tool for removing the latter from cutting relation with a blank, said means comprising a friction clamp, and a connecting device movable in the friction clamp and loosely connected with a clapper block, the said connecting device and clapper block having coöperating surfaces which are inclined to the line of travel of the tool slide and serve to hold the clapper block in cutting position by a wedging action.

8. The combination with a reciprocating tool slide, of a clapper block mounted thereon for supporting a tool, and means for tilting the clapper block during the return stroke of the tool to remove the latter from cutting relationship with a blank, said means comprising a friction clamp, a connecting device movable in the friction clamp, a clapper block having a recess with opposite surfaces inclined to the line of travel of the tool slide, and a projecting portion or tongue on the connecting device coöperating with said recess and having opposite surfaces also inclined to the line of travel of the tool slide and arranged to coöperate with the corresponding surfaces of the recess so as to swing the clapper block back and forth according to the direction of travel of the tool slide.

9. The combination with a reciprocating tool slide, of a clapper block mounted thereon for supporting a tool, and means for tilting the clapper block during the return stroke of the tool to remove the latter from cutting relation with a blank, said means comprising a friction clamp and a connecting device slidable in the friction clamp and operatively associated with the clapper block, the connection between the clapper block and the connecting device being such as to automatically take up any lost motion between said parts.

In witness whereof we have hereunto signed our names.

ARTHUR L. STEWART.
EDWARD W. BULLOCK.
SCHUYLER H. EARL.